(12) United States Patent
Fang et al.

(10) Patent No.: US 11,930,790 B1
(45) Date of Patent: Mar. 19, 2024

(54) FOLDABLE PET CLIMBING FRAME

(71) Applicant: Wuhan Jianni E-commerce Co., Ltd., Hubei (CN)

(72) Inventors: Zhihan Fang, Hubei (CN); Jinlin Yang, Hubei (CN)

( * ) Notice: Subject to any disclaimer, the term of this patent is extended or adjusted under 35 U.S.C. 154(b) by 0 days.

(21) Appl. No.: 18/446,660

(22) Filed: Aug. 9, 2023

(30) Foreign Application Priority Data

Aug. 3, 2023 (CN) .......................... 202322087708.2

(51) Int. Cl.
*A01K 15/02* (2006.01)
(52) U.S. Cl.
CPC .................. *A01K 15/027* (2013.01)
(58) Field of Classification Search
CPC ...... A01K 1/035; A01K 15/024; A01K 29/00; A01K 15/027; E04F 11/062; E04F 11/00; E04F 11/002; E04F 11/04; E04F 11/1041; E06C 1/39; E06C 1/387; E06C 7/084; E06C 7/08; E06C 1/3835
USPC .......................................... 119/847; 182/20
See application file for complete search history.

(56) References Cited

U.S. PATENT DOCUMENTS

| | | | | |
|---|---|---|---|---|
| 3,159,141 A * | 12/1964 | Paterek | ................ | A01K 15/024 482/142 |
| 6,119,634 A * | 9/2000 | Myrick | ................ | A01K 13/00 119/847 |
| 6,921,339 B1 * | 7/2005 | Martin | ................ | A63C 19/10 472/89 |
| 8,117,994 B1 * | 2/2012 | Goodlow | ............... | A01K 1/035 14/71.1 |

* cited by examiner

*Primary Examiner* — Jeffrey R Larsen (57) ABSTRACT

The present disclosure provides a foldable pet climbing frame, the pet climbing frame includes a first board, a second board, a first supporting assembly and a second supporting assembly. The first board is rotatably connected to the second board. The first supporting assembly is rotatably connected to the first board. The second supporting assembly is rotatably connected to the second board; when the pet climbing frame is unfolded, the first supporting assembly is supported on the second supporting assembly, so that the first board and the second board form a slope; and when the pet climbing frame is folded, the first board and the second board are folded with each other, the first supporting assembly is folded on the first board, and the second supporting assembly is folded on the second board.

20 Claims, 5 Drawing Sheets

FOLDABLE PET CLIMBING FRAME

CROSS-REFERENCE TO RELATED APPLICATIONS

The application claims priority of Chinese patent application CN202322087708.2, filed on 2023 Aug. 3, which is incorporated herein by reference in its entireties.

TECHNICAL FIELD

The present disclosure relates to a climbing frame, and particularly relates to a foldable pet climbing frame, which is applied to the technical field of pet supplies.

BACKGROUND

With the improvement of the living standard, more and more people keep pets, and a pet supply market has also emerged, such as a pet climbing frame. A pet climbing frame is a specially designed frame for pets, which can provide a space and a three-dimensional structure for pets to take a rest and play and can even be used for training pets. The pet climbing frame is a fashionable pet supply.

However, at present, boards of the existing pet climbing frame are connected and fixed with bolts or rivets, and it is complex to assemble the boards. However, to transfer a cat climbing frame, the bolts or rivets need to be removed; and after the transferring is completed, the cat climbing frame needs to be assembled and fixed with the bolts or rivets. In the process of removing or mounting the bolts or rivets for multiple times, it is extremely easy to damage the boards, affecting the quality of the cat climbing frame. In conclusion, the above pet climbing frame is not convenient for users to transfer and store. It reduces the use experience of the users.

SUMMARY

In response to the problem mentioned above that assembly parts of a pet climbing frame in the prior art are usually connected and fixed using bolts or rivets; to transfer the pet climbing frame, the bolts or rivets need to be removed; and after the transferring is completed, the bolts or rivets need to be assembled, causing inconvenience in transferring. The present disclosure provides a foldable pet climbing frame. A first board and a second board are rotatably connected, the first board and a first supporting assembly are rotatably connected, and the second board and a second supporting assembly are rotatably connected, so that the first board and the second board are folded with each other. The first supporting assembly is folded on the first board, and the second supporting assembly is folded on the second board, so that the overall volume of the pet climbing frame is reduced, which is convenient for storage and transferring and improves the use experience of a user.

The technical solution adopted by the present disclosure to solve the technical problem is as follows: a foldable pet climbing frame, wherein the pet climbing frame includes a first board, a second board, a first supporting assembly, and a second supporting assembly, wherein the first board is rotatably connected to the second board; the first supporting assembly is rotatably connected to the first board; the second supporting assembly is rotatably connected to the second board; when the pet climbing frame is unfolded, the first supporting assembly is supported on the second supporting assembly, so that the first board and the second board form a slope; and when the pet climbing frame is folded, the first board and the second board are folded with each other, the first supporting assembly is folded on the first board, and the second supporting assembly is folded on the second board.

Further, the first board is provided with a first accommodating cavity; the second board is provided with a second accommodating cavity; and when the pet climbing frame is folded, the first supporting assembly is arranged in the first accommodating cavity in a folded manner, and the second supporting assembly is arranged in the second accommodating cavity in a folded manner.

Further, the first accommodating cavity and the second accommodating cavity are opposite to each other; and when the first board and the second board are folded with each other, the first board and the second board abut against each other, and the first accommodating cavity and the second accommodating cavity are formed into a whole.

Further, when the first board and the second board abut against each other, the first board and the second board are locked with each other through a first locking member.

Further, a handle is arranged on an outer side of the first board or the second board.

Further, the first locking member is a buckle.

Further, the second supporting assembly is provided with one or more slope clamping positions; the first supporting assembly is provided with a clamping member; and when the pet climbing frame is unfolded, the clamping member is clamped to the slope clamping positions.

Further, the first supporting assembly includes a first supporting member A and a first supporting member B; the clamping member includes a first clamping member and a second clamping member; two or more slope clamping positions are included; the first supporting member A is rotatably connected to the first board; the first supporting member A is rotatably connected to the first supporting member B; the first clamping member is arranged on the first supporting member A; the second clamping member is arranged on the first supporting member B; and the first clamping member and the second clamping member are clamped to different slope clamping positions.

Further, the slope clamping positions include a fixed position and one or more adjustment positions; the fixed position is arranged near an end of the second supporting assembly; each adjustment position is arranged between the fixed position and a connecting end of the second supporting assembly; the first clamping member on the first supporting member A is clamped to the adjustment position; and the second clamping member on the first supporting member B is clamped to one of the fixed positions.

Further, the second supporting assembly includes a second supporting member A and a second supporting member B; one end of the second supporting member A is rotatably connected to the second supporting member B, and the other end of the second supporting member A is rotatably connected to the second board; and the fixed position and the adjustment positions are both arranged on the second supporting member B.

Further, the second supporting member B includes a second supporting plate A and a second supporting plate B; the fixed position includes a first clamping slot A and a first clamping slot B corresponding to the first clamping slot A; each adjustment position includes one or more second clamping slots A and second clamping slots B corresponding to the second clamping slots A; the second supporting plate A is rotatably connected to one side of the second supporting member A; the second supporting plate B is rotatably connected to the other side of the second supporting member A; the second supporting plate A and the second supporting plate B are both arranged in the same direction; the first clamping slot A and the second clamping slots A are formed in the second supporting plate A, and the first clamping slot B and the second clamping slots B are formed in the second supporting plate B; the first clamping slot A and the first clamping slot B are respectively arranged near an end of the second supporting plate A and an end of the second supporting plate B; the second clamping slots A are located between the first clamping slot A and the second supporting member A; the second clamping slots B are located between the first clamping slot B and the second supporting member A; the second clamping member is clamped into the first clamping slot A and the first clamping slot B; and the first clamping member is clamped into the second clamping slots A and the second clamping slots B.

Further, the first supporting member A includes a first supporting pillar A and a first supporting pillar B; the first supporting member B includes a first supporting pillar C and a first supporting pillar D; the first supporting pillar A is rotatably connected to one side of the first board, and the first supporting pillar B is rotatably connected to the other side of the first board; the first clamping member is connected between the first supporting pillar A and the first supporting pillar B; two ends of the first clamping member pass through the first supporting pillar A and the first supporting pillar B; the first supporting pillar C is rotatably connected to the first supporting pillar A, and the first supporting pillar D is rotatably connected to the first supporting pillar B; the second clamping member is connected between the first supporting pillar C and the first supporting pillar D, and two ends of the second clamping member pass through the first supporting pillar C and the first supporting pillar D; when the pet climbing frame is unfolded, the two ends of the second clamping member are respectively clamped into the first clamping slot A and the first clamping slot B; and the two ends of the first clamping member are respectively clamped into the second clamping slots A and the second clamping slots B.

Further, second transition arc surfaces are arranged between the first clamping slot A and the second supporting plate A as well as between the second clamping slots A and the second supporting plate A; and second transition arc surfaces are arranged between the first clamping slot B and the second supporting plate B as well as between the second clamping slots B and the second supporting plate B.

Further, a reinforcing rib is arranged between the second supporting plate A and the second supporting plate B; and one end of the reinforcing rib is fixedly connected to the second supporting plate A, and the other end of the reinforcing rib is fixedly connected to the second supporting plate B.

Further, the second supporting plate A is provided with a third clamping slot A, and the second supporting plate B is provided with a third clamping slot B corresponding to the third clamping slot A; and when the first board and the second board are folded with each other, two ends of the second clamping member are accommodated in the third clamping slot A and the third clamping slot B.

Further, the first board is rotatably connected to the first supporting assembly through a first connector; the first connector is fixed to the first board; and the first supporting assembly is rotatably connected to the first connector.

Further, a second locking member is arranged near a junction between the first board and the second board; and when the first board and the second board are unfolded, the first board and the second board are maintained in an unfolded state through the second locking member.

Further, the second locking member is a buckle.

Further, both the first board and the second board are provided with anti-slip convex blocks.

Further, the pet climbing frame further includes an anti-slip floor mat; and the anti-slip floor mat is paved on the first board and the second board.

Beneficial effects: the present disclosure provides a foldable pet climbing frame. After the first board and the second board, the first board and the first supporting assembly, and the second board and the second supporting assembly are folded in an accommodating cavity, the first board and the second board are locked through a first buckle to form a box body, which reduces the overall volume of the pet climbing frame, making the pet climbing frame easy to store and transfer. Furthermore, a handle is arranged on an outer side of the first board or the second board, making it easier for a user to carry and improving the use experience of the user.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Referring to FIG. 1 to FIG. 6, the present disclosure provides a foldable pet climbing frame. The pet climbing frame includes a first board 1, a second board 2, a first supporting assembly 3, and a second supporting assembly 4.

The first board 1 is rotatably connected to the second board 2; the first supporting assembly 3 is rotatably connected to the first board 1; the second supporting assembly 4 is rotatably connected to the second board 2; when the pet climbing frame is unfolded, the first supporting assembly 3 is supported on the second supporting assembly 4, so that the first board 1 and the second board 2 form a slope; and when the pet climbing frame is folded, the first board 1 and the second board 2 are folded with each other, the first supporting assembly 3 is folded on the first board 1, and the second supporting assembly 4 is folded on the second board 2. Due to the foldability of the pet climbing frame, the overall volume of the pet climbing frame is reduced, which is convenient for storage and transferring by a user.

Figure 3:
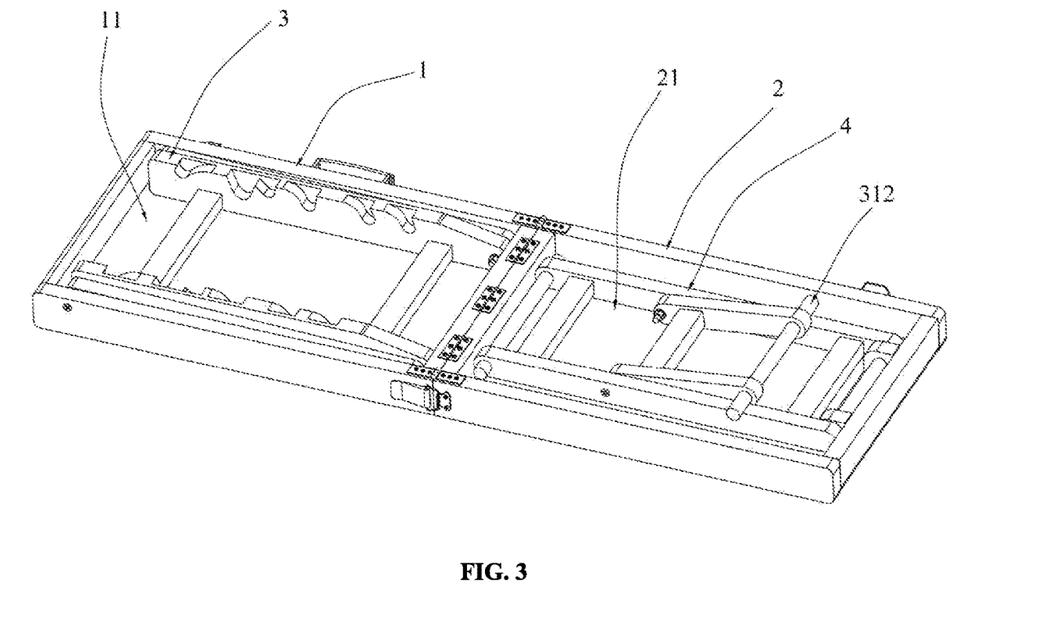
FIG. 3 is a schematic diagram of folding of a first supporting assembly and a second supporting assembly according to the present disclosure.

In this embodiment, as shown in FIG. 3, the first board 1 is provided with a first accommodating cavity 11; the second board 2 is provided with a second accommodating cavity 21; and when the pet climbing frame is folded, the first supporting assembly 3 is arranged in the first accommodating cavity 11 in a folded manner, and the second supporting assembly 4 is arranged in the second accommodating cavity 21 in a folded manner. Due to the accommodating cavities, it is more convenient for a user to fold and store the pet climbing frame; and the entire pet climbing frame is tidy after being folded and is convenient to carry.

Figure 4:
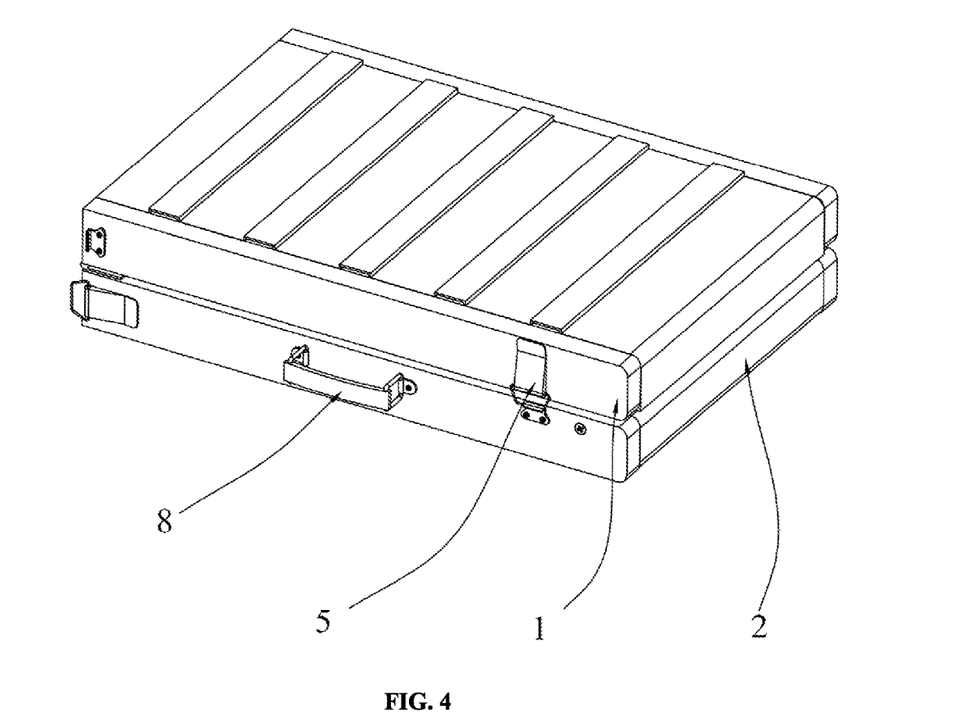
FIG. 4 is a schematic structural diagram of a foldable pet climbing frame according to the present disclosure after folding.

In this embodiment, as shown in FIG. 4, the first accommodating cavity 11 and the second accommodating cavity 21 are opposite to each other; and when the first board 1 and the second board 2 are folded with each other, the first board 1 and the second board 2 abut against each other, and the first accommodating cavity 11 and the second accommodating cavity 21 are formed into a whole. The pet climbing frame is formed into a box body as a whole after being folded, which is more convenient for a user to move the pet climbing frame.

In this embodiment, when the first board 1 and the second board 2 abut against each other, the first board 1 and the second board 2 are locked with each other through a first locking member 5. After the pet climbing frame is folded into a box body as a whole, the first board 1 and the second board 2 are locked, preventing such a phenomenon that the pet climbing frame needs to be folded again because the pet climbing frame is easy to break in a moving process. The first locking member 5 in this embodiment can be a buckle, but is not limited to a buckle. It can also be in the form of a fastener, a sliding block locking form, or a password-based unlocking form, but a buckle is preferred because the buckle is more convenient to mount and lock.

A handle 8 is arranged on an outer side of the first board 1 or the second board 2. After the first locking member 5 locks the first board 1 and the second board 2, the pet climbing frame is formed into the box body. It is more labor-saving when a user moves the pet climbing frame with the handle 8.

Figure 1:
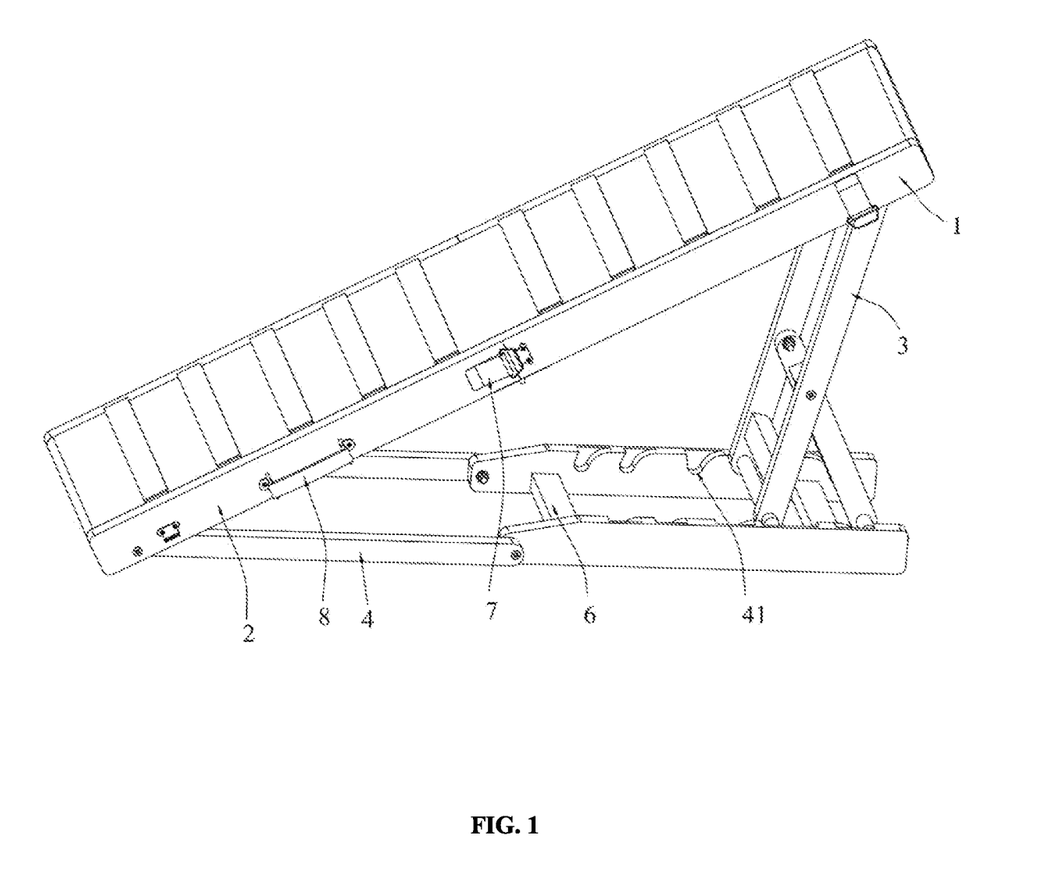
FIG. 1 is a three-dimensional diagram of a foldable pet climbing frame according to the present disclosure.
Figure 2:
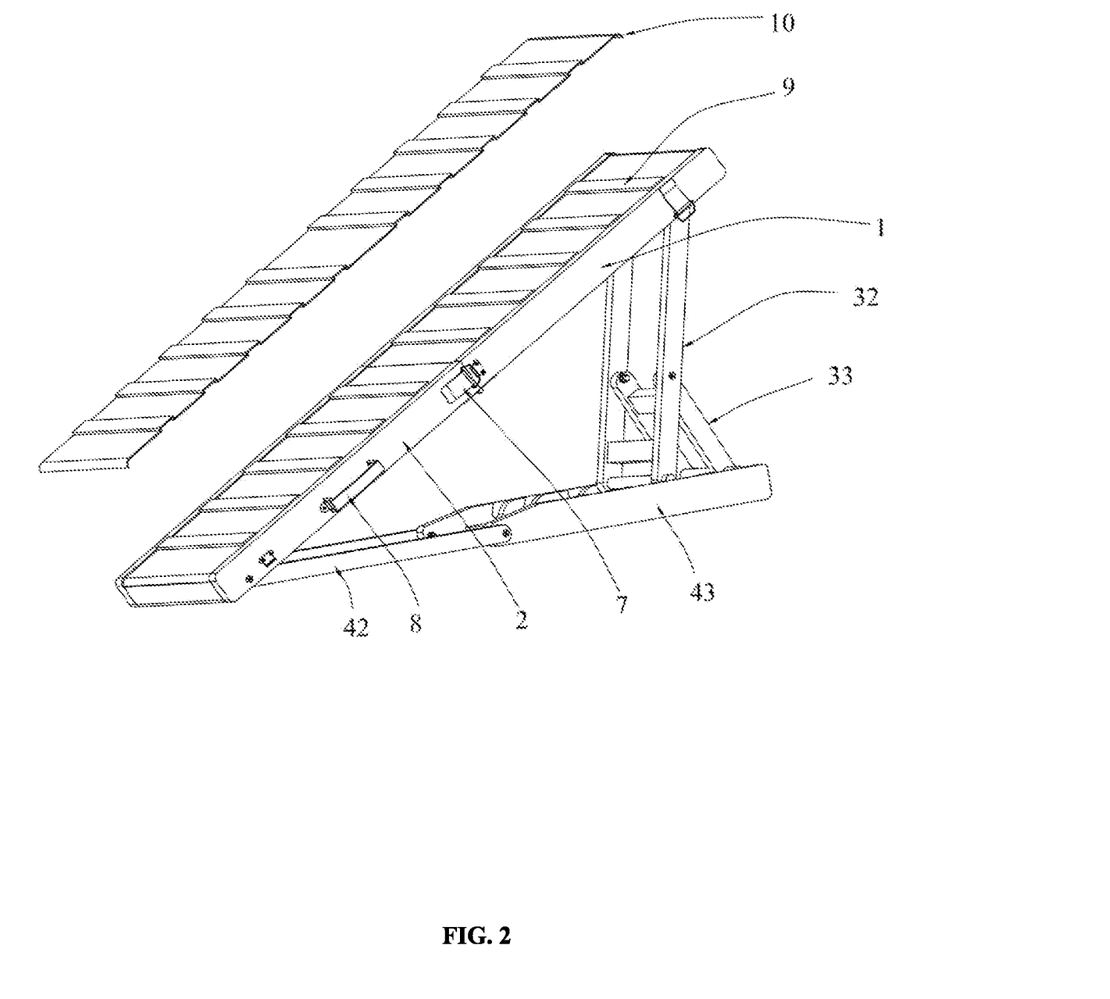
FIG. 2 is a schematic structural diagram of a foldable pet climbing frame according to the present disclosure.

In this embodiment, as shown in FIG. 1, the second supporting assembly 4 is provided with one or more slope clamping positions 41; the first supporting assembly 3 is provided with a clamping member 31; and when the pet climbing frame is unfolded, the clamping member 31 is clamped to the slope clamping positions 41. The clamping member 31 is mainly used to position the slopes of the first board and the second board. The slope of the pet climbing frame in the prior art cannot be adjusted. The adjustable slopes of the boards in this embodiment add more fun to play. For example, if the slopes have a large degree of inclination, the pet climbing frame can be used to train pets. If the slopes have a small degree of inclination, pets can take a rest on the boards. Manufacturers can set a plurality of slope clamping positions 41 according to an actual situation, for example, three or four slopes. In this embodiment, the second supporting assembly 4 is preferably provided with four slope clamping positions 41 to meet the playing need of the pets.

Figure 5:
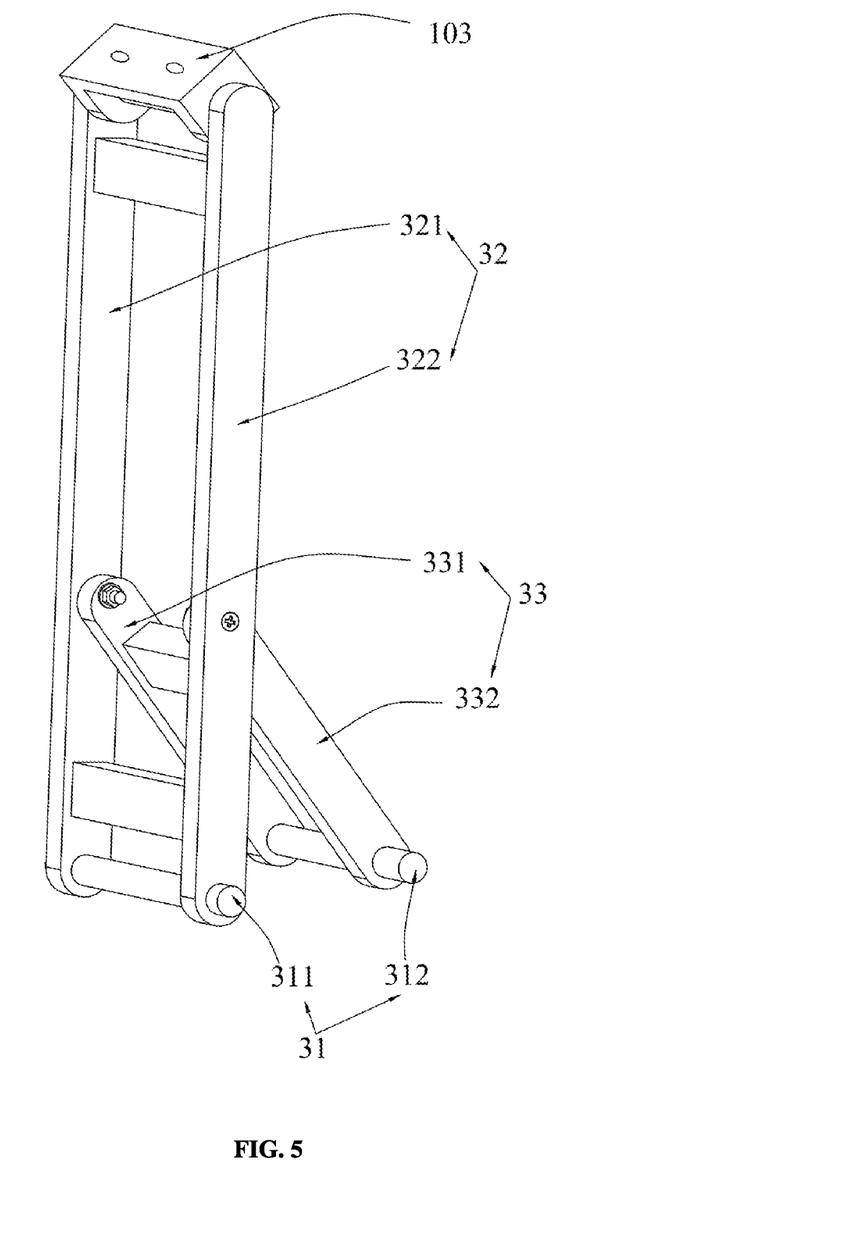
FIG. 5 is a schematic structural diagram of a second supporting assembly according to the present disclosure.

In this embodiment, as shown in FIG. 5, the first supporting assembly 3 includes a first supporting member A 32 and a first supporting member B 33; the clamping member 31 includes a first clamping member 311 and a second clamping member 312; two or more slope clamping positions 41 are included; the first supporting member A 32 is rotatably connected to the first board 1; the first supporting member A 32 is rotatably connected to the first supporting member B 33; the first clamping member 311 is arranged on the first supporting member A 32; the second clamping member 312 is arranged on the first supporting member B 33; and the first clamping member 311 and the second clamping member 312 are clamped to different slope clamping positions 41. The first supporting member A 32, the first supporting member B 33, the first clamping member 311, and the second clamping member 312 achieve an effect of adjusting the slopes of the first board 1 and the second board 2. Furthermore, due to the arrangement of the first supporting member A 32, the first supporting member B 33, the first clamping member 311, and the second clamping member 312, the pet climbing frame has a simple structure and is convenient to assemble.

In this embodiment, as shown in FIG. 5, the slope clamping positions 41 include a fixed position 411 and one or more adjustment positions 412; the fixed position 411 is arranged near an end of the second supporting assembly 4; each adjustment position 412 is arranged between the fixed position 411 and a connecting end of the second supporting assembly 4; the first clamping member 311 on the first supporting member A 32 is clamped to one adjustment position 412; and the second clamping member 312 on the first supporting member B 33 is clamped to the fixed position 411. The fixed position 411 and the adjustment positions 412 are more convenient for a user to adjust the slopes of the first board 1 and the second board 2. That is, if the first supporting member B 33 is clamped to the fixed position 411 and does not move, only the first supporting member A 32 needs to be adjusted, which is convenient for the user to adjust the slopes of the first board and the second board.

Figure 6:
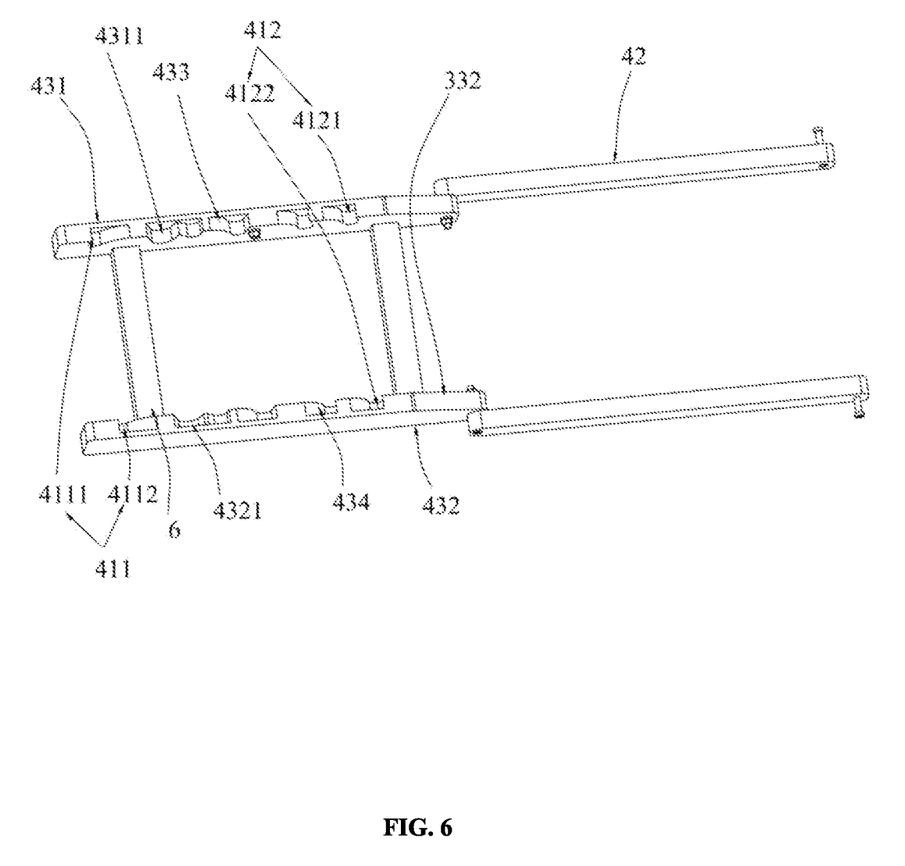
FIG. 6 is a schematic structural diagram of a first supporting assembly according to the present disclosure.

In this embodiment, as shown in FIG. 6, the second supporting assembly 4 includes a second supporting member A 42 and a second supporting member B 43; one end of the second supporting member A 42 is rotatably connected to the second supporting member B 43, and the other end of the second supporting member A 42 is rotatably connected to the second board 2; and the fixed position 411 and the adjustment positions 412 are both arranged on the second supporting member B 43. The second supporting member A 42 and the second board 2 are rotatably connected, which is more convenient for storage in the second accommodating cavity of the second board, so that the overall volume of the pet climbing frame is reduced.

In this embodiment, as shown in FIG. 6, the second supporting member B 43 includes a second supporting plate A 431 and a second supporting plate B 432; the fixed position 411 includes a first clamping slot A 4111 and a first clamping slot B 4112 corresponding to the first clamping slot A 4111; each adjustment position 412 includes one or more second clamping slots A 4121 and second clamping slots B 4122 corresponding to the second clamping slots A 4121; the second supporting plate A 431 is rotatably connected to one side of the second supporting member A 42; the second supporting plate B 432 is rotatably connected to the other side of the second supporting member A 42; the second supporting plate A 431 and the second supporting plate B 43 are both arranged in the same direction; the first clamping slot A 4111 and the second clamping slots A 4121 are formed in the second supporting plate A 431, and the first clamping slot B 4112 and the second clamping slots B 4122 are formed in the second supporting plate B 432; the first clamping slot A 4111 and the first clamping slot B 4112 are respectively arranged near an end of the second supporting plate A 431 and an end of the second supporting plate B 432; the second clamping slots A 4121 are located between the first clamping slot A 4111 and the second supporting member A 42; the second clamping slots B 4122 are located between the first clamping slot B 4112 and the second supporting member A 42; the second clamping member 312 is clamped into the first clamping slot A 4111 and the first clamping slot B 4112; and the first clamping member 311 is clamped into the second clamping slots A 4121 and the second clamping slots B 4122. The first clamping slot A 4111 and the second clamping slots A 4121 are integrally formed with the second supporting plate A 431, and the first clamping slot B 4112 and the second clamping slots B 4122 are integrally formed with the second supporting plate B 432, facilitating demolding. The second supporting plate A 431 and the second supporting plate B 432 are preferably parallel to each other.

In this embodiment, as shown in FIG. 6, second transition arc surfaces 433 are arranged between the first clamping slot A 4111 and the second supporting plate A 431 as well as between the second clamping slots A 4121 and the second supporting plate A 431; and second transition arc surfaces 434 are arranged between the first clamping slot B 4112 and the second supporting plate B 432 as well as between the second clamping slots B 4122 and the second supporting plate B 432. Due to the arrangement of the transition arc surfaces, it is convenient to put the clamping members into the clamping slots, so that a user does not need to align the clamping members with the clamping slots. The clamping members can slide into the clamping slots when placed on the transition arc surfaces, so that it brings convenience to mounting.

In this embodiment, as shown in FIG. 5, the first supporting member A 32 includes a first supporting pillar A 321 and a first supporting pillar B 322; the first supporting member B 33 includes a first supporting pillar C 331 and a first supporting pillar D 332; the first supporting pillar A 321 is rotatably connected to one side of the first board 1, and the first supporting pillar B 322 is rotatably connected to the other side of the first board 1; the first clamping member 311 is connected between the first supporting pillar A 321 and the first supporting pillar B 322; two ends of the first clamping member 311 pass through the first supporting pillar A 321 and the first supporting pillar B 322; the first supporting pillar C 331 is rotatably connected to the first supporting pillar A 321, and the first supporting pillar D 332 is rotatably connected to the first supporting pillar B 322; the second clamping member 312 is connected between the first supporting pillar C 331 and the first supporting pillar D 332, and two ends of the second clamping member 312 pass through the first supporting pillar C 331 and the first supporting pillar D 332; when the pet climbing frame is unfolded, the two ends of the second clamping member 312 are respectively clamped into the first clamping slot A 4111 and the first clamping slot B 4112; and the two ends of the first clamping member 311 are respectively clamped into the second clamping slots A 4121 and the second clamping slots B 4122. Due to the arrangement of the first supporting pillar A 321 and the first supporting pillar B 322, the parts are simple, which are convenient to assemble.

In this embodiment, as shown in FIG. 6, the second supporting plate A 431 is provided with a third clamping slot A 4311, and the second supporting plate B 432 is provided with a third clamping slot B 4321 corresponding to the third clamping slot A 4311; and when the first board 1 and the second board 2 are folded with each other, two ends of the second clamping member 312 are accommodated in the third clamping slot A 4311 and the third clamping slot B 4321. The third clamping slot A 4311 and the third clamping slot B 4321 are mainly used to accommodate the second clamping member 312, so that the first board and the second board can abut against each other to form the box body. The third clamping slot A 4311 and the third clamping slot B 4321 are not limited to being arranged on the second supporting plate A 431 and the second supporting plate B 432, and they can also be arranged on the first supporting pillar C 331 and the first supporting pillar D 332. However, it is preferred that the third clamping slot A 4311 and the third clamping slot B 4321 are arranged on the second supporting plate A 431 and the second supporting plate B 432. If the third clamping slot A 4311 and the third clamping slot B 4321 are arranged on the first supporting pillar C 331 and the first supporting pillar D 332, the first supporting pillar C 331 and the first supporting pillar D 332 may not be firm. As a result, the pet climbing frame has the defects of low quality and short life.

In this embodiment, a reinforcing rib 6 is arranged between the second supporting plate A 431 and the second supporting plate B 432; and one end of the reinforcing rib 6 is fixedly connected to the second supporting plate A 431, and the other end of the reinforcing rib 6 is fixedly connected to the second supporting plate B 432. Due to the arrangement of the reinforcing rib 6, the pet climbing frame is more stable and has higher quality and longer service life.

In this embodiment, the first board 1 is rotatably connected to the first supporting assembly 3 through a first connector 103; one end of the first connector 103 is fixed on the first board 1; and the other end of the first connector 103 is rotatably connected to the first supporting assembly 3.

In this embodiment, a second locking member 7 is arranged near a junction between the first board 1 and the second board 2; and when the first board 1 and the second board 2 are unfolded, the first board 1 and the second board 2 are maintained in an unfolded state through the second locking member 7. A first function of the second locking member 7 is to fix angles of the first supporting plate and the second supporting plate after the first supporting plate and the second supporting plate are unfolded, so that it is convenient for the first supporting assembly to support the second supporting assembly, or when the first supporting assembly is going to be mounted on the second supporting assembly, the first board 1 and the second board 2 are easily folded with each other, making it hard for a user to mount the first supporting assembly. A second function of the second locking member 7 is to make the first board 1 and the second board 2 have higher bearing force, which prolongs the service life of the pet climbing frame.

In this embodiment, the second locking member 7 is a buckle. The second locking member 7 in this embodiment can be a buckle, but is not limited to a buckle. It can also be in the form of a fastener, a sliding block locking form, or a password-based unlocking form, but a buckle is preferred because the buckle is more convenient to mount and lock.

In this embodiment, both the first board 1 and the second board 2 are provided with anti-slip convex blocks 9. The anti-slip convex blocks 9 have an anti-slip effect, facilitating pets' climbing and playing.

In this embodiment, the pet climbing frame further includes an anti-slip floor mat 10; and the anti-slip floor mat 10 is paved on the first board 1 and the second board 2, so that pets feel more comfortable when playing on the pet climbing frame.

In conclusion, the foldable pet climbing frame in this embodiment can be folded into the box body, facilitating a user to transfer the pet climbing frame.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A foldable pet climbing frame, wherein the pet climbing frame comprises a first board, a second board, a first supporting assembly, and a second supporting assembly, wherein the first board is rotatably connected to the second board; the first supporting assembly is rotatably connected to the first board; the second supporting assembly is rotatably connected to the second board; when the pet climbing frame is unfolded, the first supporting assembly is supported on the second supporting assembly, so that the first board and the second board form a slope; and when the pet climbing frame is folded, the first board and the second board are folded with each other, the first supporting assembly is folded on the first board, and the second supporting assembly is folded on the second board.

2. The foldable pet climbing frame according to claim 1, wherein the first board is provided with a first accommodating cavity; the second board is provided with a second accommodating cavity; and when the pet climbing frame is folded, the first supporting assembly is arranged in the first accommodating cavity in a folded manner, and the second supporting assembly is arranged in the second accommodating cavity in a folded manner.

3. The foldable pet climbing frame according to claim 2, wherein the first accommodating cavity and the second accommodating cavity are opposite to each other; and when the first board and the second board are folded with each other, the first board and the second board abut against each other, and the first accommodating cavity and the second accommodating cavity are formed into a whole.

4. The foldable pet climbing frame according to claim 3, wherein when the first board and the second board abut against each other, the first board and the second board are locked with each other through a first locking member.

5. The foldable pet climbing frame according to claim 4, wherein a handle is arranged on an outer side of the first board or the second board.

6. The foldable pet climbing frame according to claim 4, wherein the first locking member is a buckle.

7. The foldable pet climbing frame according to claim 3, wherein the second supporting assembly is provided with one or more slope clamping positions; the first supporting assembly is provided with a clamping member; and when the pet climbing frame is unfolded, the clamping member is clamped to the slope clamping positions.

8. The foldable pet climbing frame according to claim 7, wherein the first supporting assembly comprises a first supporting member A and a first supporting member B; the clamping member comprises a first clamping member and a second clamping member; two or more slope clamping positions are comprised; the first supporting member A is rotatably connected to the first board; the first supporting member A is rotatably connected to the first supporting member B; the first clamping member is arranged on the first supporting member A; the second clamping member is arranged on the first supporting member B; and the first clamping member and the second clamping member are clamped to different slope clamping positions.

9. The foldable pet climbing frame according to claim 8, wherein the slope clamping positions comprise a fixed position and one or more adjustment positions; the fixed position is arranged near an end of the second supporting assembly; each adjustment position is arranged between the fixed position and a connecting end of the second supporting assembly; the first clamping member on the first supporting member A is clamped to the adjustment position; and the second clamping member on the first supporting member B is clamped to one of the fixed positions.

10. The foldable pet climbing frame according to claim 9, wherein the second supporting assembly comprises a second supporting member A and a second supporting member B; one end of the second supporting member A is rotatably connected to the second supporting member B, and the other end of the second supporting member A is rotatably connected to the second board; and the fixed position and the adjustment positions are both arranged on the second supporting member B.

11. The foldable pet climbing frame according to claim 10, wherein the second supporting member B comprises a second supporting plate A and a second supporting plate B; the fixed position comprises a first clamping slot A and a first clamping slot B corresponding to the first clamping slot A; each adjustment position comprises one or more second clamping slots A and second clamping slots B corresponding to the second clamping slots A; the second supporting plate A is rotatably connected to one side of the second supporting member A; the second supporting plate B is rotatably connected to the other side of the second supporting member A; the second supporting plate A and the second supporting plate B are both arranged in the same direction; the first clamping slot A and the second clamping slots A are formed in the second supporting plate A, and the first clamping slot B and the second clamping slots B are formed in the second supporting plate B; the first clamping slot A and the first clamping slot B are respectively arranged near an end of the second supporting plate A and an end of the second supporting plate B; the second clamping slots A are located between the first clamping slot A and the second supporting member A; the second clamping slots B are located between the first clamping slot B and the second supporting member A; the second clamping member is clamped into the first clamping slot A and the first clamping slot B; and the first clamping member is clamped into the second clamping slots A and the second clamping slots B.

12. The foldable pet climbing frame according to claim 11, wherein the first supporting member A comprises a first supporting pillar A and a first supporting pillar B; the first supporting member B comprises a first supporting pillar C and a first supporting pillar D; the first supporting pillar A is rotatably connected to one side of the first board, and the first supporting pillar B is rotatably connected to the other side of the first board; the first clamping member is connected between the first supporting pillar A and the first supporting pillar B; two ends of the first clamping member pass through the first supporting pillar A and the first supporting pillar B; the first supporting pillar C is rotatably connected to the first supporting pillar A, and the first supporting pillar D is rotatably connected to the first supporting pillar B; the second clamping member is connected between the first supporting pillar C and the first supporting pillar D, and two ends of the second clamping member pass through the first supporting pillar C and the first supporting pillar D; when the pet climbing frame is unfolded, the two ends of the second clamping member are respectively clamped into the first clamping slot A and the first clamping slot B; and the two ends of the first clamping member are respectively clamped into the second clamping slots A and the second clamping slots B.

13. The foldable pet climbing frame according to claim 11, wherein second transition arc surfaces are arranged between the first clamping slot A and the second supporting plate A as well as between the second clamping slots A and the second supporting plate A; and second transition arc surfaces are arranged between the first clamping slot B and the second supporting plate B as well as between the second clamping slots B and the second supporting plate B.

14. The foldable pet climbing frame according to claim 11, wherein a reinforcing rib is arranged between the second supporting plate A and the second supporting plate B; and one end of the reinforcing rib is fixedly connected to the second supporting plate A, and the other end of the reinforcing rib is fixedly connected to the second supporting plate B.

15. The foldable pet climbing frame according to claim 11, wherein the second supporting plate A is provided with a third clamping slot A, and the second supporting plate B is provided with a third clamping slot B corresponding to the third clamping slot A; and when the first board and the second board are folded with each other, two ends of the second clamping member are accommodated in the third clamping slot A and the third clamping slot B.

16. The foldable pet climbing frame according to claim 1, wherein the first board is rotatably connected to the first supporting assembly through a first connector; the first connector is fixed to the first board; and the first supporting assembly is rotatably connected to the first connector.

17. The foldable pet climbing frame according to claim 1, wherein a second locking member is arranged near a junction between the first board and the second board; and when the first board and the second board are unfolded, the first board and the second board are maintained in an unfolded state through the second locking member.

18. The foldable pet climbing frame according to claim 17, wherein the second locking member is a buckle.

19. The foldable pet climbing frame according to claim 1, wherein both the first board and the second board are provided with anti-slip convex blocks.

20. The foldable pet climbing frame according to claim 1, wherein the pet climbing frame further comprises an anti-slip floor mat; and the anti-slip floor mat is paved on the first board and the second board.

* * * * *